(12) United States Patent
Porter et al.

(10) Patent No.: US 10,298,857 B2
(45) Date of Patent: May 21, 2019

(54) IMAGE PROCESSING METHOD AND APPARATUS, INTEGRATED CIRCUITRY AND RECORDING MEDIUM FOR APPLYING GAIN TO A PIXEL

(71) Applicant: Sony Corporation, Tokyo (JP)

(72) Inventors: Robert Mark Stefan Porter, Winchester (GB); Clive Henry Gillard, Alton (GB); Daniel Luke Hooper, Horsell (GB)

(73) Assignee: Sony Corporation, Tokyo (JP)

( * ) Notice: Subject to any disclaimer, the term of this patent is extended or adjusted under 35 U.S.C. 154(b) by 70 days.

(21) Appl. No.: 15/415,358

(22) Filed: Jan. 25, 2017

(65) Prior Publication Data

US 2017/0302858 A1    Oct. 19, 2017

(30) Foreign Application Priority Data

Apr. 13, 2016  (GB) .................................. 1606393.5

(51) Int. Cl.
*H04N 5/243*    (2006.01)
*H04N 5/232*    (2006.01)
*H04N 5/235*    (2006.01)

(52) U.S. Cl.
CPC .......... *H04N 5/243* (2013.01); *H04N 5/2351* (2013.01); *H04N 5/2352* (2013.01);
(Continued)

(58) Field of Classification Search
CPC ............... H04N 5/243; H04N 5/23229; H04N 5/23293; H04N 5/2351; H04N 5/2352; H04N 5/2355
(Continued)

(56) References Cited

U.S. PATENT DOCUMENTS 8,248,486 B1 *  8/2012  Ward ...................... H04N 9/67
                                                  348/223.1
8,761,497 B2    6/2014  Berkovich et al.
(Continued)

FOREIGN PATENT DOCUMENTS

GB         2 341 507 A      3/2000
WO      WO 2010/024782 A1   3/2010
WO      WO 2015/180854 A1   12/2015

*Primary Examiner* — Antoinette T Spinks
(74) *Attorney, Agent, or Firm* — Oblon, McClelland, Maier & Neustadt, L.L.P.

(57) ABSTRACT

An image processing method comprising: receiving a first image signal representing a portion of a captured image with a first dynamic range; generating a second image signal using the first image signal: applying one of: a first gain to the brightness value of each pixel in the portion of the captured image represented by the first image signal having a brightness value less than a first threshold brightness value, the first gain serving to increase the brightness value of each pixel to which it is applied, and a second gain to the brightness value of each pixel in the portion of the captured image represented by the first image signal having a brightness value greater than a second threshold brightness value, the second gain serving to decrease the brightness value of each pixel to which it is applied; and after the application of the one of the first and second gains, performing a conversion process such that the brightness value of each pixel in the portion of the captured image represented by the first image signal becomes represented in the second format, thus forming the second image signal.

18 Claims, 7 Drawing Sheets

(52) U.S. Cl.
CPC ....... *H04N 5/2355* (2013.01); *H04N 5/23229* (2013.01); *H04N 5/23293* (2013.01)

(58) Field of Classification Search
USPC ...................................................... 348/222.1
See application file for complete search history.

(56) References Cited

U.S. PATENT DOCUMENTS

| | | | |
|---|---|---|---|
| 9,154,708 B1* | 10/2015 | Rivard | H04N 5/2352 |
| 2009/0303363 A1* | 12/2009 | Blessinger | H04N 5/355 |
| | | | 348/300 |
| 2010/0207955 A1* | 8/2010 | Nishimaki | G09G 3/2007 |
| | | | 345/589 |
| 2012/0147953 A1* | 6/2012 | El-Mahdy | H04N 19/61 |
| | | | 375/240.03 |
| 2014/0044372 A1* | 2/2014 | Mertens | H04N 19/46 |
| | | | 382/248 |
| 2014/0267822 A1 | 9/2014 | Roffet | |
| 2014/0285472 A1* | 9/2014 | Raynor | G06F 3/0416 |
| | | | 345/175 |
| 2014/0320694 A1* | 10/2014 | Okuno | H04N 5/2351 |
| | | | 348/229.1 |
| 2015/0189210 A1* | 7/2015 | Shimizu | H04N 5/378 |
| | | | 348/301 |
| 2015/0350516 A1* | 12/2015 | Rivard | H04N 5/2355 |
| | | | 348/229.1 |
| 2016/0371822 A1* | 12/2016 | Le Pendu | H04N 19/147 |
| 2017/0013182 A1* | 1/2017 | Oshima | G03B 7/091 |
| 2017/0078706 A1* | 3/2017 | Van Der Vleuten | H04N 5/20 |
| 2017/0180759 A1* | 6/2017 | Mertens | H04N 19/98 |

* cited by examiner

IMAGE PROCESSING METHOD AND APPARATUS, INTEGRATED CIRCUITRY AND RECORDING MEDIUM FOR APPLYING GAIN TO A PIXEL

CROSS REFERENCE TO RELATED APPLICATIONS

The present application claims priority to United Kingdom Application 1606393.5 filed on 13 Apr. 2016, contents of which being incorporated herein by reference in its entirety.

BACKGROUND

Field of the Disclosure

The present disclosure relates to an image processing method and apparatus, integrated circuitry and a recording medium.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure Any image captured by a camera will have a certain dynamic range. The concept of dynamic range is well known in the art, and represents the difference in light level between the lightest discernible portion of a captured image and the darkest discernible portion of that captured image. The dynamic range available to a digital camera is limited because such cameras rely on capturing photons of light using pixels. The darkest discernible portion of a captured image is limited in accordance with the light level in the captured scene below which no photons (above a background noise level) can be captured by a pixel. Such a pixel will appear in the image as black, and lower light levels in the captured scene will also result in the pixel appearing in the image as black. Details in the scene associated with such low light levels (known as shadows) will therefore not be discernible in the image, but will instead by represented by blocks of black pixels. Such portions of the image are said to be "blacked out". Similarly, the lightest discernible portion of a captured image is limited in accordance with the light level in the captured scene above which the maximum number of photons which can be captured by a pixel is reached (in this case, the pixel is described as saturated). Such a pixel will appear in the image as white, and higher light levels in the captured scene will also result in the pixel appearing in the image as white. Details in the scene associated with such high light levels (known as highlights) will therefore not be discernible in the image, but will instead by represented by blocks of white pixels. Such portions of the image are said to be "bleached". In both the cases of black out and bleaching, information from the scene is lost in the captured image. The greater the difference between lowest light level that can be captured by a camera prior to black out occurring and the highest light level that can be captured by the camera prior to bleaching occurring, the greater the dynamic range (and lower the loss of information) of the images produced by that camera.

In order to try to increase the dynamic range of captured images, some modern cameras are equipped with High Dynamic Range (HDR) imaging technology. For example, HDR cameras may capture a plurality of images, with each image being captured at a different exposure level. For example, a first image is captured at a first, lower exposure level (for example, using a higher shutter speed so that less light reaches the image sensor of the camera) so as to avoid pixels associated with the lighter regions of the scene becoming saturated. This allows details of the lighter regions of the scene to be captured in the first image (avoiding bleaching). On the other hand, due to the low exposure level, not enough light is captured from the darker regions of the scene, and thus blacking out occurs in the pixels associated with the darker regions of the scene and no detail in these regions can be captured. After the capture of the first image, a second image is captured at a second, higher exposure level (for example, using a lower shutter speed so that more light reaches the image sensor of the camera) so as to allow pixels associated with the darker regions of the scene to capture more light. This allows details of the darker regions of the scene to be captured in the second image (thus avoiding black out). On the other hand, due to the higher exposure level, too much captured light is captured from the brighter regions of the scene and thus bleaching occurs in the pixels associated with the lighter regions and no detail in these lighter regions can be captured. Once both the first and second images have been captured, both images are electronically combined so as to form a single combined image in which both the details of the light regions from the first image and the details of the dark regions from the second image can be seen. A greater dynamic range of the scene has thus been captured, because there is less information loss in darker or lighter regions than when the first or second images are considered alone. It will be appreciated that further images may be captured and combined, depending on the dynamic range of each captured image and the dynamic range of the real life scene. By capturing enough images at appropriate different exposure levels and combining these images, the entire dynamic range of a scene can thus be captured. Various HDR methods, including methods for capturing and combining multiple images, are known in the art. It is also noted that many of today's high-end cameras can capture images with a dynamic range higher than that which can be displayed by many televisions and computer monitors (for example) even without employing HDR techniques involving multiple images (such as the one previously described).

A problem arises, however, in that even though a high dynamic range image may be captured by a camera using the above-mentioned HDR techniques, the dynamic range of that image may have to be reduced in order for the image to be displayed (the image being displayed on a liquid crystal display (LCD) or the like, for example). This will happen when, for example, the number of bits for indicating the brightness (for example, the luminance or luma) of each pixel available to the display for displaying the image is reduced compared to the number of bits for indicating the brightness of each pixel as used by the camera when the image is captured. This may be because of the display itself, or because of limited bandwidth being available for exchanging image signals between the camera and display, for example. This latter situation is common in live broadcasting scenarios, for example, in which captured images are processed and displayed in real time. In this case, a reduction in the number of bits used to represent the brightness of each pixel in the captured image is desired in order to reduce the time between image capture and image display, thus maintaining the real time characteristic of the broadcast.

This reduction in the number of bits available to represent each pixel brightness requires the pixel brightness values generated by the camera, which are represented by a larger number of bits, to be mapped to pixel brightness values represented by a smaller number of bits. This is generally achieved by cutting off the bottom end and the top end of the dynamic range so that the darkest areas of an image become a solid dark shade (or represented by a smaller number of darker shades) and the lightest areas of that image become a solid light shade (or represented by a smaller number of lighter shades). In between these two extremes, a tone curve or 3D Lookup Table (3D LUT) is used to map the original pixel brightness values onto a smaller number of bits so that as much of the detail in the picture as possible is preserved. However, it will be appreciated that this results in a loss of detail in the lightest and darkest parts of the image. This is undesirable, especially for images which have large areas of very light and very dark pixels (for example, as occurs in images of sports stadiums captured in bright sunlight with dark shadows). In such cases, the details of large areas of the image will be lost.

There is therefore a need to overcome the above-mentioned problems.

SUMMARY

In one embodiment, the present technique provides an image processing method comprising receiving a first image signal representing a portion of a captured image with a first dynamic range, wherein a value indicative of the brightness of each pixel in the portion of the captured image is represented by the first image signal in a first format such that the first dynamic range of the portion of the captured image is preserved; generating a second image signal using the first image signal, wherein a value indicative of the brightness of each pixel in the portion of the captured image is represented by the second image signal in a second format, the second format being for displaying the portion of the captured image on a display and being such that the second image signal represents the portion of the captured image with a second dynamic range which is lower than the first dynamic range; and outputting the second image signal for display of the portion of the captured image; wherein the second image signal is generated by: applying one of: a first gain to the brightness value of each pixel in the portion of the captured image represented by the first image signal having a brightness value less than a first threshold brightness value, the first gain serving to increase the brightness value of each pixel to which it is applied, and a second gain to the brightness value of each pixel in the portion of the captured image represented by the first image signal having a brightness value greater than a second threshold brightness value, the second gain serving to decrease the brightness value of each pixel to which it is applied; and after the application of the one of the first and second gains, performing a conversion process such that the brightness value of each pixel in the portion of the captured image represented by the first image signal becomes represented in the second format, thus forming the second image signal.

In another embodiment, the present technique provides an image processing apparatus comprising an image processor operable to: receive a first image signal representing a portion of a captured image with a first dynamic range, wherein a value indicative of the brightness of each pixel in the portion of the captured image is represented by the first image signal in a first format such that the first dynamic range of the portion of the captured image is preserved; generate a second image signal using the first image signal, wherein a value indicative of the brightness of each pixel in the portion of the captured image is represented by the second image signal in a second format, the second format being for displaying the portion of the captured image on a display and being such that the second image signal represents the portion of the captured image with a second dynamic range which is lower than the first dynamic range; and output the second image signal for display of the portion of the captured image; wherein the second image signal is generated by: applying one of: a first gain to the brightness value of each pixel in the portion of the captured image represented by the first image signal having a brightness value less than a first threshold brightness value, the first gain serving to increase the brightness value of each pixel to which it is applied, and a second gain to the brightness value of each pixel in the portion of the captured image represented by the first image signal having a brightness value greater than a second threshold brightness value, the second gain serving to decrease the brightness value of each pixel to which it is applied; and after the application of the one of the first and second gains, performing a conversion process such that the brightness value of each pixel in the portion of the captured image represented by the first image signal becomes represented in the second format, thus forming the second image signal.

In another embodiment, the present technique provides integrated circuitry for an image processing apparatus, the integrated circuitry comprising an image processing element operable to: receive a first image signal representing a portion of a captured image with a first dynamic range, wherein a value indicative of the brightness of each pixel in the portion of the captured image is represented by the first image signal in a first format such that the first dynamic range of the portion of the captured image is preserved; generate a second image signal using the first image signal, wherein a value indicative of the brightness of each pixel in the portion of the captured image is represented by the second image signal in a second format, the second format being for displaying the portion of the captured image on a display and being such that the second image signal represents the portion of the captured image with a second dynamic range which is lower than the first dynamic range; and output the second image signal for display of the portion of the captured image; wherein the second image signal is generated by: applying one of: a first gain to the brightness value of each pixel in the portion of the captured image represented by the first image signal having a brightness value less than a first threshold brightness value, the first gain serving to increase the brightness value of each pixel to which it is applied, and a second gain to the brightness value of each pixel in the portion of the captured image represented by the first image signal having a brightness value greater than a second threshold brightness value, the second gain serving to decrease the brightness value of each pixel to which it is applied; and after the application of the one of the first and second gains, performing a conversion process such that the brightness value of each pixel in the portion of the captured image represented by the first image signal becomes represented in the second format, thus forming the second image signal.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
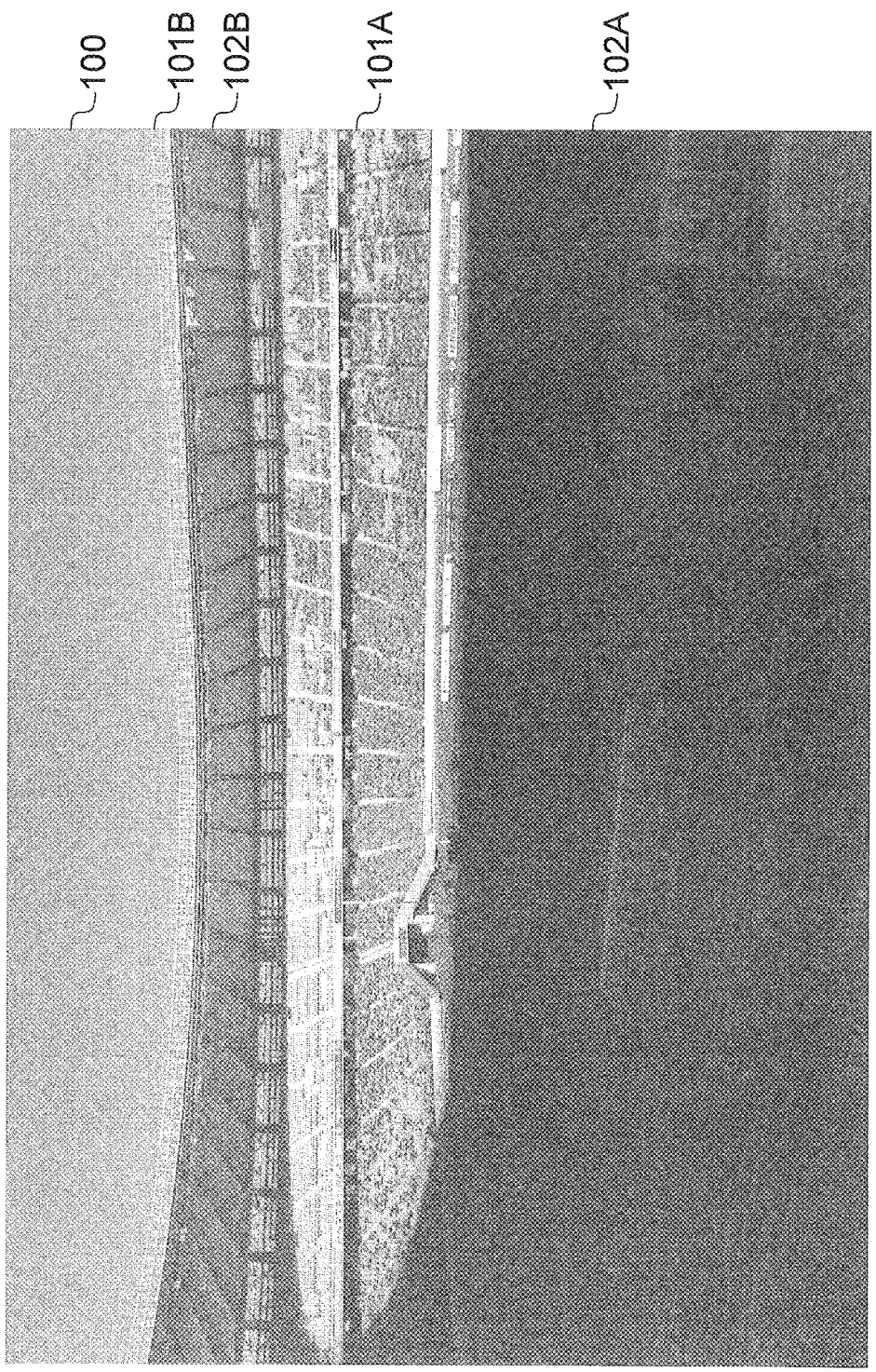
FIG. 1 shows an example of a captured image.

Referring now to the drawings, wherein like reference numerals designate identical or corresponding parts throughout the several views.

FIG. 1 shows a captured image 100 with a large dynamic range which has been captured using an HDR camera but then mapped to a smaller number of bits so as to allow the image to be displayed in real time and/or to be displayed using a display with a lower dynamic range. In particular, the brightness value of each pixel in the HDR captured image has been mapped to a new brightness value using a reduced number of bits, thus reducing the bandwidth required for transmitting the captured image from the camera to the display so as to allow real time display of the captured image and/or allowing the image to be displayed using a display with a lower dynamic range.

The image 100 is an image of a sports stadium, and comprises lighter regions 101A and 101B (representing parts of the sports stadium in sunlight) and darker regions 102A and 102B (representing parts of the sports stadium in shadow). It is seen that the sports game (in this case, a game of rugby) is occurring largely in the darker region 102A. In order to improve the visibility of the rugby game to the human eye, it is desirable to artificially increase the brightness value of each pixel in the darker regions 102A-B. This brightens up the darker regions 102A-B and makes it easier to view the sports game in the image 100. Such techniques are known in the art and may be referred to as shadow suppression techniques. The problem, however, is that, in this case, the mapping of the original HDR pixel brightness values to new pixel brightness values represented by a smaller number of bits has been achieved by reducing the number of darker shades used in the darker regions 102A-B. In particular, some parts of the darker regions 102A-B have been blacked out due to the need to reduce the number of darker shades used. Details of the darker regions 102A-B are therefore lost. This is a particular problem for the darker region 102A in which the rugby game is largely being played and which is thus the region of most interest.

Such details cannot be obtained again simply by increasing the brightness value of each pixel in the darker regions 102A-B, as used in conventional shadow suppression techniques. Such a process would make the darker regions 102A-B brighter, but would not bring back the information which has been lost. Rather, such a process would result in the same reduced number of shades being used to represent the darker regions 102A-B (thus maintaining the same amount of information as before), the only difference being that each of these shades would now be lighter. The image 100 thus provides unsatisfactory visibility of the rugby game to a viewer.

It will be appreciated that a similar problem will arise in the case that the number of bits required to represent each pixel brightness value is reduced compared to that in the original HDR image by reducing the number of lighter shades used in the lighter image regions 101A-B or by reducing both the number of darker shades used in the darker image regions 102A-B and lighter shades used in the lighter image regions 101A-B. In either case, a reduction in the number of shades used in the lighter and/or darker regions will remove image detail from these regions, thus resulting in deterioration in the quality of the image 100. It will also be appreciated that this problem is not unique to images of football stadiums or the like, and will be experienced for any captured image with a large dynamic range which must then be converted so that pixel brightness values of the image can be represented using a smaller number of bits.

Figure 2:
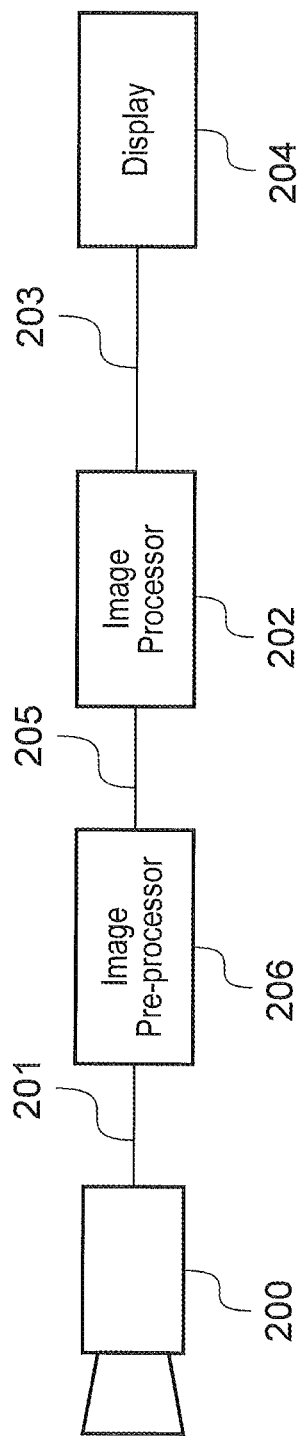
FIG. 2 schematically shows an example arrangement according to the present technique.

In order to alleviate the above-mentioned problems, the present technique provides an arrangement as exemplified in FIG. 2. The arrangement of FIG. 2 comprises a camera 200, an image pre-processor 206, an image processor 202 and a display 204. The camera 200 uses a suitable HDR method in order to capture an original image with a high dynamic range. This HDR image is then transmitted to the image pre-processor 204 via a first communication channel 201. The image is then processed by the image pre-processor 204, and the pre-processed image is transmitted to the image processor 202 via a second communication channel 205. The processed image is then transmitted to the display 204 via a third communication channel 203. The processed image is then displayed by the display 204. It is noted that the first, second and third communication channels 201, 205 and 203 may be any wired and/or wireless communication channel suitable for carrying an image signal, as known in the art. In some embodiments, the image pre-processor 206 may be omitted, in which case the HDR image generated by the camera 200 is transmitted directly to the image processor 202 via a communication channel connecting the camera 200 and image processor 202. It will be appreciated that, in some embodiments, the image pre-processor 206 (if present) and/or the image processor 202 be comprised as additional components of the camera 200 or display 204 rather than as separate components (as shown in FIG. 2).

Figure 3:
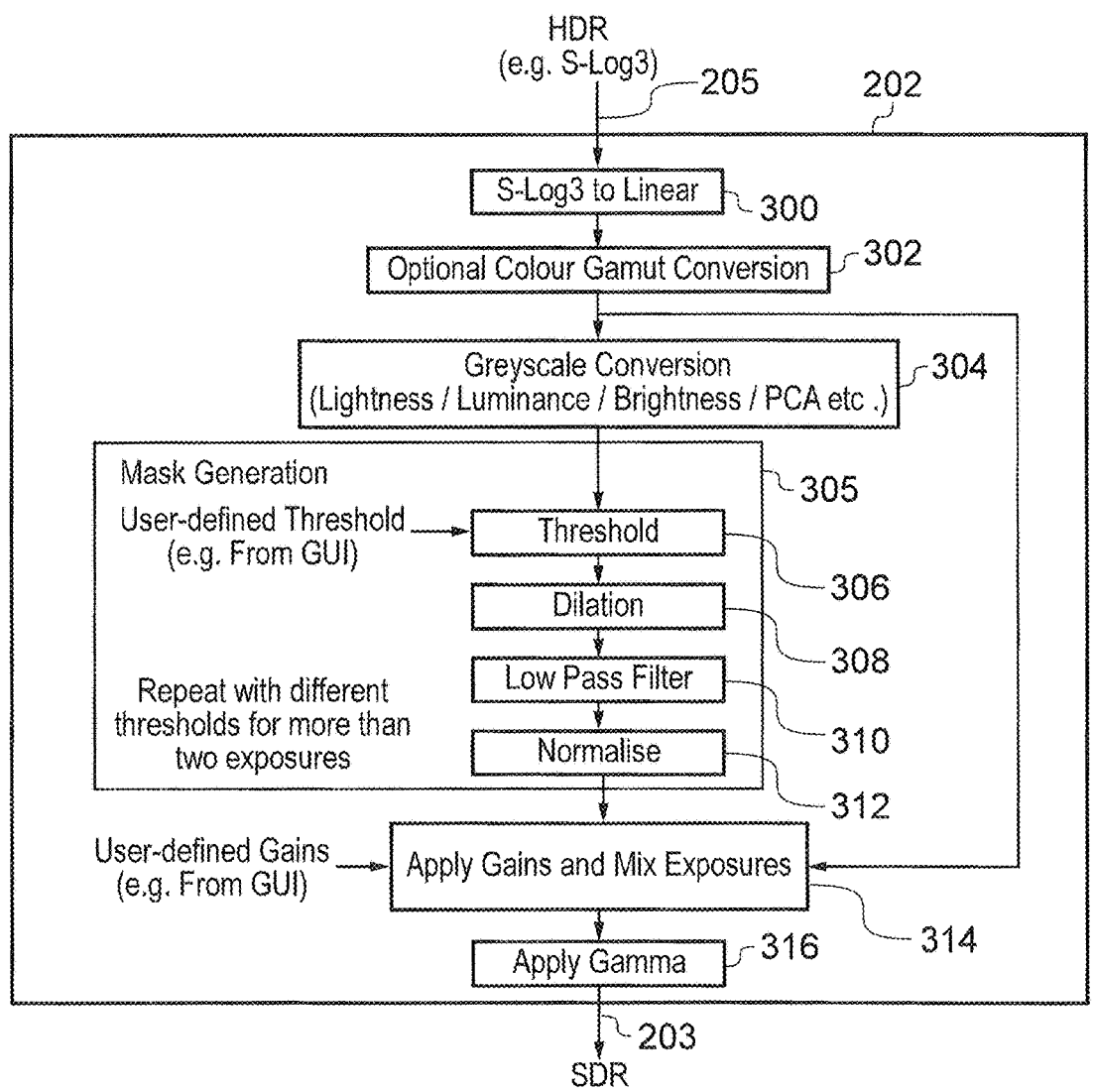
FIG. 3 schematically shows an example image processor according to the present technique.

The image processor 202 is schematically shown in more detail in FIG. 3. The image processor 202 comprises a linear conversion unit 300, a colour gamut conversion unit 302 (this being optional), a greyscale conversion unit 304, a mask generation unit 305, a gain application and exposure mixing unit 314 and a gamma application unit 316. The mask generation unit 305 comprises a threshold pixel determining unit 306, a dilation unit 208, a low pass filter 310 and a normalisation unit 312.

Figure 4:
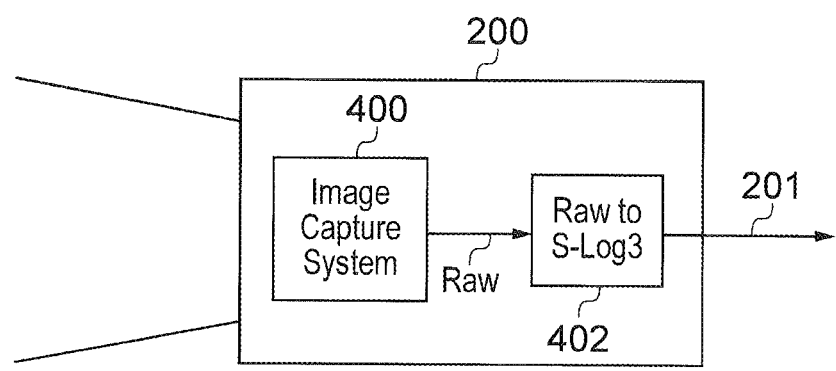
FIG. 4 schematically shows an example camera according to the present technique.

The camera 200 is schematically shown in more detail in FIG. 4. The camera 202 comprises an image capture system 400 and a conversion unit 402. The image capture system 400 comprises all components necessary for capturing electronic images, as known in the art. For example, the image capture system 400 will comprise a lens arrangement, an image sensor, a memory for recording images captured by the image sensor and a controller for controlling each of the other components. Image capture systems in cameras are well known in the art and will therefore not be described in detail here. The image capture system 400 captures images in a raw image format and outputs them to the conversion unit 402. The raw images captured and output by the image capture system 400 have a large dynamic range, and thus more closely represent the dynamic range of the real scene which is captured. This is achieved by the image capture system 400 using a suitable HDR imaging technique, for example (as previously discussed).

The conversion unit 402 converts the images received from the image capture system 400 from the raw format to an S-Log3 format. S-Log3 is a known Sony® image format which allows an original raw image, represented by pixels with a brightness value defined by a higher number of bits (for example, 12, 14 or 16 bits), to be represented by pixels with a brightness value defined by a lower number of bits (for example, 10 bits). At the same time, the dynamic range of the image is preserved due to the way in which the pixel conversion takes place. S-Log3 uses a particular type of logarithmic gamma curve for converting the pixel brightness values of the raw input image signal to the pixel brightness values of the output image signal (the pixel brightness values of the output image signal being represented by a smaller number of bits) whilst preserving the dynamic range of the raw image. It will be appreciated that the use of S-Log3 is only an example, however, and that the raw image signal may be converted to another suitable format in which the dynamic range is preserved (for example, using a different type of logarithmic gamma curve to S-Log3). In another embodiment, there may be no conversion. In this case, it is the raw image data which is output by the camera 202 directly (and thus the camera 202 need not comprise the conversion unit 402). It is noted, however, that the use of conversion so that the image signal output from the camera 202 uses a smaller number of bits to define each pixel brightness value is particularly desirable, since this reduces the bandwidth requirement for real time capture and display of images and/or allows the images to be displayed using a display with a lower dynamic range. In particular, the use of S-Log3 is desirable, because S-Log3 allows each pixel brightness value to be represented as a 10 bit luma value, thus allowing the arrangement of the present disclosure to be implemented easily into existing broadcasting arrangements (in which 10 bit images are passed down the broadcasting chain).

The converted image generated by the conversion unit 402 is output by the camera 200 to the image pre-processor 202 using the first communication channel 201. As previously described, the converted image preserves the high dynamic range of the original raw image captured by the camera 200, and is thus an HDR image.

The image is then pre-processed by the image pre-processor 206 (the details of which are described later on). The pre-processed image is then transmitted to the image processor 202 via second communication channel 205. Once the image signal is received by the image processor 202, it is passed to the linear conversion unit 300, which converts the logarithmic S-Log3 signal to a linear signal. It will be appreciated that if a different logarithmic conversion technique is used by the conversion unit 402 of the camera 202 (that is, a technique other than S-Log3), then the linear conversion unit 300 will also need to convert the received signal to a linear signal. On the other hand, if the received signal is already linear (for example, if it is a linear raw image signal which is transmitted from the camera 200 to the image processor 202 without conversion to S-Log3 or the like), then the linear conversion will not have to be applied to the received image signal. In this case, the received image signal is passed directly to the colour gamut conversion unit 302 (and the linear conversion unit 300 may be omitted).

The colour gamut conversion unit 302 receives the image signal (either from the linear conversion unit 300 or directly from the camera, the latter occurring in the case that a linear image signal is output directly by the camera 200) and performs colour gamut conversion on the image signal. The colour gamut conversion is required when there is a colour gamut mismatch between the camera 200 and display 204, and is performed using any suitable technique, as known in the art. For example, the colour gamut may be converted so that it conforms to the ITU-R Recommendation BT.709 (Rec. 709) standard. If no colour gamut conversion is required (as occurs when, for example, there is no significant colour mismatch between the camera 200 and display 204), then the colour gamut conversion unit 302 may be omitted from the image processor 202 (in which case the image signal is passed directly from the linear conversion unit 300 or directly from the camera 202 (as appropriate) to the greyscale conversion unit 304). In this sense, the inclusion of the colour gamut conversion unit 302 in the image processor is an optional component.

The greyscale conversion unit 304 receives the image signal (from the colour gamut conversion unit 302, the linear conversion unit 300 or directly from the camera 200, as appropriate) and performs greyscale conversion on the image signal using any suitable technique known in the art. For example, the greyscale conversion may be performed by extracting a value from each pixel which is indicative of that pixel's lightness, luminance, brightness, principal component analysis (PCA), or the like. The extracted value of a particular pixel is then used as, or is used to generate, a greyscale intensity value for that pixel. As an example, in the case that an S-Log3 image is received from the camera 200 and converted to a linear format by linear conversion unit 300, and the colour gamut is converted so as to conform to the Rec. 709 standard, the luminance may be extracted and used as the greyscale intensity value for each pixel in the image.

The greyscale conversion converts a colour received image to a greyscale image, in which each pixel in the image is represented by a shade of grey ranging from black (representing the darkest part of the image) to white (representing the lightest part of the image). Each shade of grey is represented by a greyscale pixel intensity value. For example, black may be represented by the smallest possible greyscale intensity value (for example, 0) and white may be represented by the largest possible greyscale intensity value (for example, 1023, assuming that each greyscale intensity value is defined using 10 bits). All the other shades in between are then represented by greyscale intensity values in between the smallest and largest possible greyscale intensity values (for example, between 0 and 1023), with the shade of grey of a pixel incrementally appearing lighter as the greyscale intensity value is incrementally increased. The converted greyscale image is then passed to the mask generation unit 305.

As previously mentioned, the mask generation unit 305 comprises a threshold pixel determining unit 306, a dilation unit 308, a low pass filter 310 and a normalisation unit 312.

Following receipt of the image signal from the greyscale conversion unit 304, the threshold pixel determining unit 306 determines each of the pixels in the greyscale image with a greyscale intensity value which is less than or greater than a predetermined threshold greyscale intensity value. The threshold value, together with whether the pixels to be determined are pixels with a greyscale intensity value which is less than the threshold value or pixels with a greyscale intensity value which is greater than the threshold value, is determined, for example, by a user who inputs this information to the image processor 202 via a user interface (not shown). The threshold value, together with whether the pixels to be determined are pixels with a greyscale intensity value which is less than the threshold value or pixels with a greyscale intensity value which is greater than the threshold value, is determined based on the user's desire for how to adjust an image. Alternatively, the threshold value, together with whether the pixels to be determined are pixels with a greyscale intensity value which is less than the threshold value or pixels with a greyscale intensity value which is greater than the threshold value, may be determined automatically based on a suitable image analysis technique known to the skilled person.

For example, if the user wishes to take the image 100 and to lighten up the darker region 102A so that the rugby game can be seen more easily, then the user will select, as a threshold value, a greyscale intensity value such that most pixels in the darker region 102A will have a greyscale intensity value which is less than this threshold value. The user will then indicate to the image processor 202 that they wish all pixels with a greyscale intensity value which is less than the threshold value to be selected. This means that all pixels in the image 100 with a greyscale intensity value which is less than the threshold value will be selected, and this will include most of the pixels in the darker region 102A (and also, in this case, most of the pixels in the darker region 102B). As an alternative example, if the user wishes to darken down the lighter regions 101A-B of the image 100 (for example, if the lighter regions 101A-B appear to be too bright for the desired purpose of the image), then the user will select, as a threshold value, a greyscale intensity value such that most pixels in the lighter regions 101A-B will have a greyscale intensity value which is greater than this threshold value. The user will then indicate to the image processor 202 that they wish all pixels with a greyscale intensity value which is greater than the threshold value to be selected. This means that all pixels in the image 100 with a greyscale intensity value which is greater than the threshold value will be selected, and this will include most of the pixels in the lighter regions 101A-B. It is noted that these are only examples and that, in general, a user (or, alternatively, automatic process based on a suitable image analysis technique) will select the threshold value and whether pixels with greyscale intensity values less than or greater than the threshold value are to be selected based on the desired characteristics of the adjusted image.

After a portion of the pixels of the image have been selected by the threshold pixel determining unit 306, the image (together with information indicating which pixels have been selected) is passed to the dilation unit 308, which performs a dilation function on the one or more portions of the image comprising the selected pixels. Any suitable image dilation function, as known in the art, may be used. The dilated image is then passed to the low pass filter 310, which performs a low pass filter function (also known as a blurring function) on the dilated one or more portions of the image. Again, any suitable low pass filter function, as known in the art, may be used. In one example, the low pass filter 310 is a 500 tap filter. The effect of the dilation and low pass filter functions is to smooth out the perceivable boundary between the selected and non-selected pixels. The result is a mask of selected pixels which can then be used for further operations (including gain adjustment to brighten parts of the image which are too dark and/or darken parts of the image which are too bright), as explained later on.

Figure 5A:
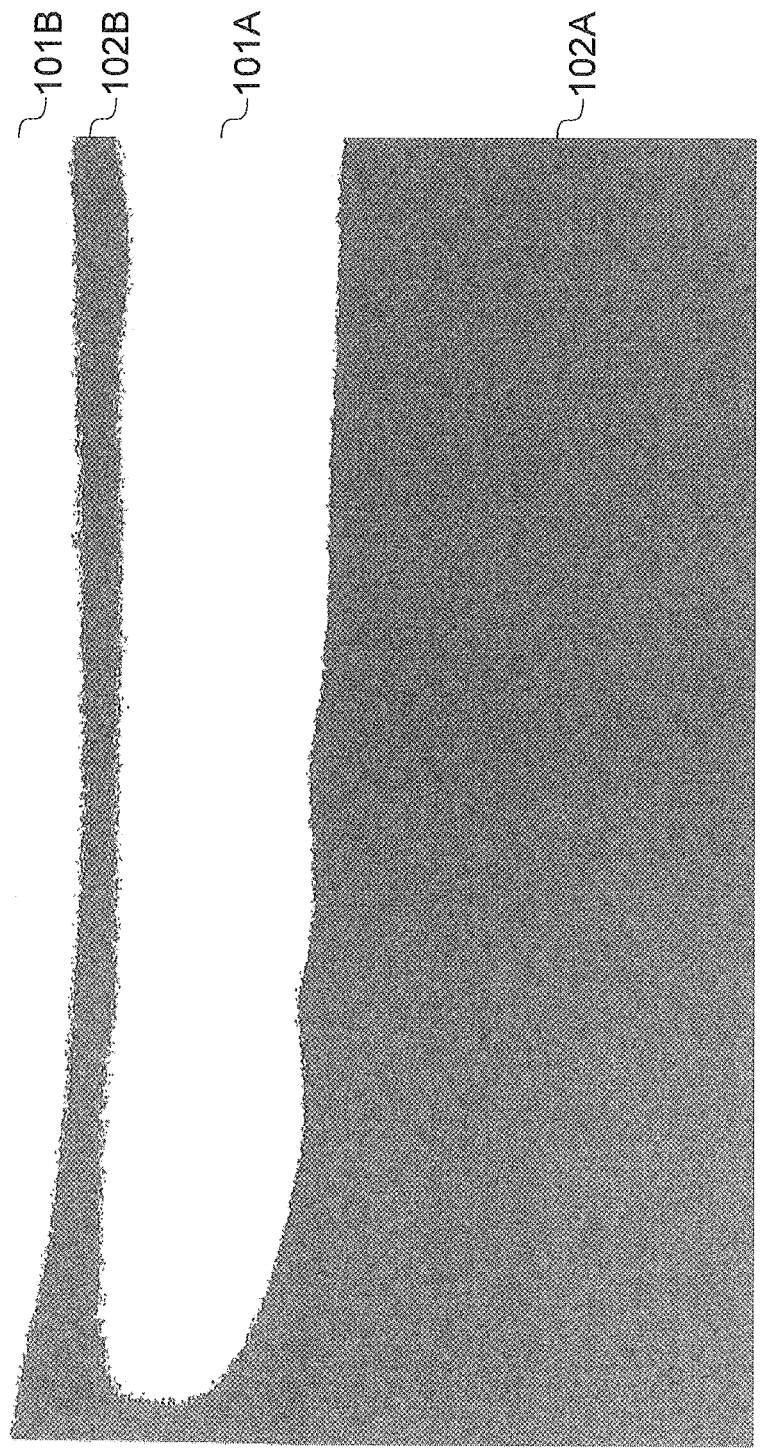
FIGS. 5A and 5B show an example distribution of pixel selection values and adjusted pixel selection values according to the present technique.
Figure 5B:
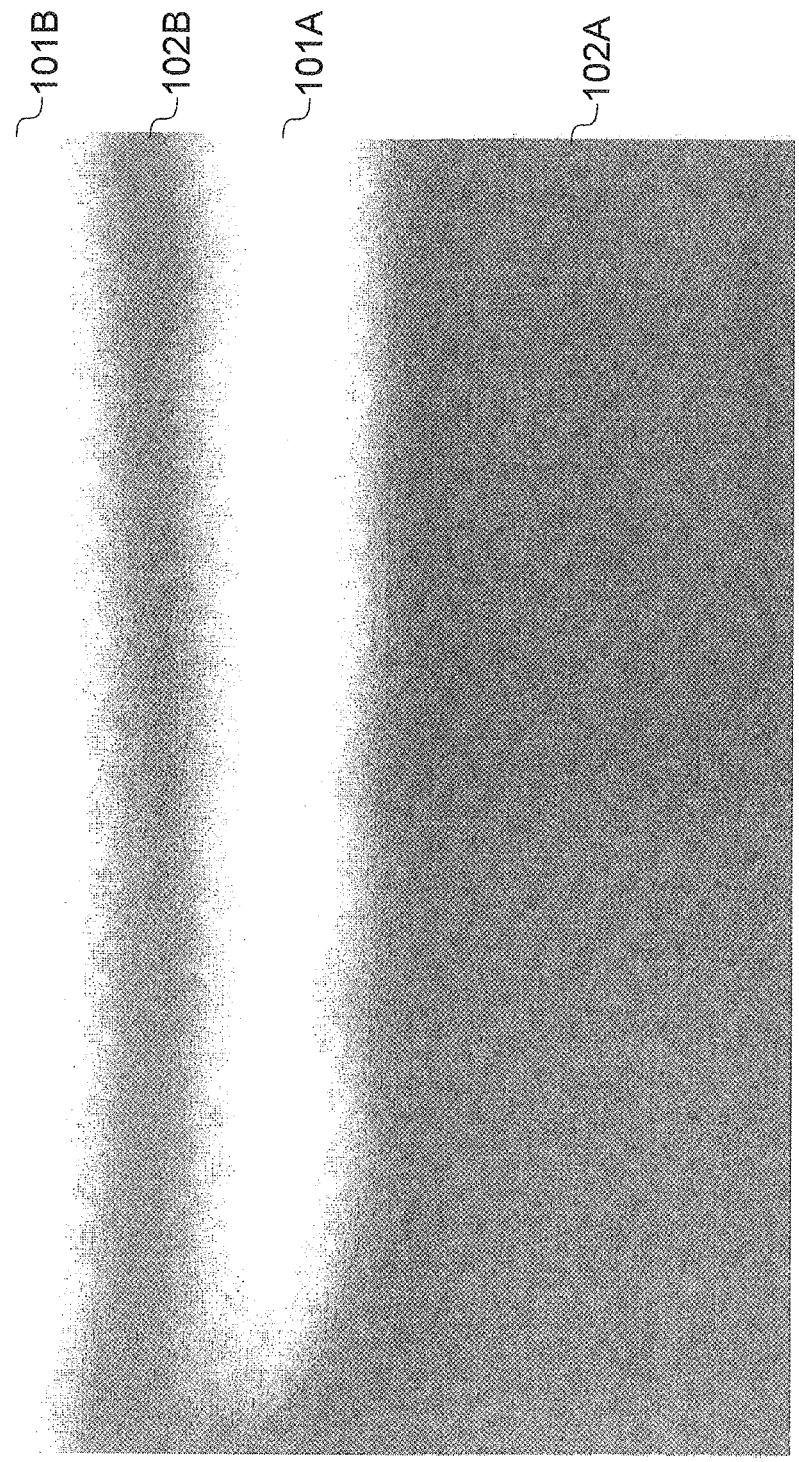

An example of the generation of such a mask from the image 100 is schematically shown with reference to FIGS. 5A and 5B. The mask is generated by selecting all pixels in the image 100 with a greyscale intensity value which is less than a threshold value. The threshold value has been chosen so that only the pixels in the darker regions 102A-B of the image 100 are selected. In FIG. 5A, the selected pixels are shown as shaded, and the non-selected pixels are shown as not shaded. It can be seen that, due to the selection process performed by the threshold pixel selection unit 306, the pixels roughly corresponding to the darker regions 102A-B of the image 100 have been selected (and are thus shown as shaded), whereas the pixels roughly corresponding to the lighter regions 101A-B of the image 100 have not been selected (and thus are shown as not shaded).

FIG. 5B shows the selected pixels of FIG. 5A when dilation and low pass filtering have been applied to these pixels. It can be seen that the effect of the dilation and low pass filtering is that there is now a smooth, gradual gradient between a value indicating that a pixel is selected and a value indicating that a pixel is not selected, as explained in more detail below. In addition, some pixels that were previously not selected at all by the threshold pixel selection unit 306 (due to not having a brightness value below the threshold value) have now been selected (see below for more details). The result is a mask of selected pixels with smooth boundaries between regions of selected pixels and regions of non-selected pixels which can then be applied to the image 100. This helps ensure that the application of further operations to the selected pixels, such as lightening or darkening, has a more natural looking effect on the image 100.

It is noted that the reference numerals indicative of the darker regions 102A-B and lighter regions 101A-B of the image 100 have been added to FIGS. 5A-B so as to clearly denote the correspondence between these darker and lighter regions and the selected pixels of the image 100 shown in FIGS. 5A and 5B.

After the dilation and low pass filter functions have been applied to the selected pixels, the image is passed to the normalisation unit 312 which normalises the values of the selected pixels. It is noted that the use of the dilation unit 308 and low pass filter 310 results in each of the selected pixels having a value which indicates the extent of that pixel's selection. More specifically, following the initial selection of pixels by the threshold pixel selection unit 306, each of the pixels is allocated a value indicating whether or not that pixel has been selected. For example, in the case that a pixel has not been selected, then it is assigned the value 0, and in the case that a pixel has been selected, then it is assigned the value 1023 (assuming a 10 bit representation of pixel selection, for example). The dilation and low pass filtering processes are then performed on an array of the assigned pixel selection values, wherein the position of each pixel selection value in the array corresponds to the position of the pixel in the captured image to which the pixel selection value relates. The dilation and low pass filtering change the selection value of certain pixels of the image 100 so as to produce a smooth gradient in pixel selection value at boundaries between selected pixel and non-selected pixel regions. In particular, the original step gradient between a selected pixel (with pixel selection value 1023) and a non-selected pixel (with pixel selection value 0) at a boundary is converted to a more gradual gradient in which the pixel selection value is gradually decreased from 1023 to 0 in smaller steps over several pixels which extend across the boundary. The result of the application of the dilation and low pass filter functions is therefore that not only are pixels selected or not selected, but each pixel has a pixel selection value indicative of the extent to which that pixel is selected. This allows a further operation (such as a lightening or darkening function) which is to be applied to the selected pixels to be applied to different extents, depending on the pixel selection value. It is this pixel selection value which is normalised by the normalisation unit 312.

It is noted that the mask shown in FIG. 5B shows the distribution of pixel selection values (representative of the pixel selection value array) after dilation and low pass filtering. Here, the higher the pixel selection value, the darker the shading of the pixel. It can thus be seen that non-selected pixels (with a pixel selection value of 0) in the lighter regions 101A-B appear not shaded, whereas pixels with higher pixel selection values in the darker regions 102A-B appear shaded. At the boundaries between the lighter and darker regions, where there is a gradual change in pixel selection value (as a result of the dilation and low pass filtering functions), it can be seen that there is a corresponding gradual change in the level of shading from shaded (in the darker regions 102A-B) to unshaded (in the lighter regions 101A-13). This exemplifies the smooth, blurred boundaries between the lighter and darker regions which are generated by the dilation and low pass filtering functions.

The normalisation results in the pixel selection value of each pixel being mapped to the range 0 to 1. For example, in the case that a minimum pixel selection value is 0 and a maximum pixel selection value is 1023, then each of the $2^{10}=1024$ values in the range 0 and 1023 will be mapped to values in the range 0 to 1 so that the minimum pixel selection value is maintained as 0 but the maximum pixel selection value is now 1. All other values (that is, the incrementally increasing values 1 to 1022) are then mapped to corresponding incrementally increasing values between the values 0 and 1 (so, for example, 1 is mapped to 1/1023=0.00098 (to 2 significant figures), 2 is mapped to 2/1023=0.0020, and so on). The use of such normalisation makes it easier to mathematically calculate the correct gain value to be applied to each pixel in the image.

After normalisation of the pixel selection values, the pixel selection values are passed to the gain application and exposure mixing unit 314. The originally received image 100 (as received from the linear conversion unit 300, the colour gamut conversion unit 302, or directly from the camera 200, as appropriate) is also supplied to the gain application and exposure mixing unit 314. Further processing is then applied to each pixel of the image 100 by the gain application and mixing unit 314 in order to adjust the gain of a value indicative of the brightness of each pixel (for example, a pixel brightness value such as the lightness, luminance, brightness, principal component analysis (PCA), or the like of the pixel) in accordance with a gain value supplied by the user (again, input via the user interface) or generated automatically (using a suitable image analysis technique known to the skilled person) and the pixel selection value of each pixel. It is noted that, as an example, in the case that an S-Log3 image is received from the camera 200 and converted to a linear format by linear conversion unit 300, and the colour gamut is converted so as to conform to the Rec. 709 standard, the luminance may be used as the pixel brightness value for each pixel in the image. Furthermore, in one example, when the linear signal of the image is in an RGB format, the gain value may be applied to each of the R, G and B values for each pixel in accordance with the selection value for that pixel. In this case, it is recognised that the sum of the R, G and B values for each pixel is indicative of the brightness of that pixel.

Thus, to continue with the previous example, the selected pixels in the image 100 have each been allocated a normalised value within the range 0 to 1. This normalised value indicates the extent to which each of these pixels has been selected and indicates the extent to which the gain should be applied to each of these pixels. In this example, the desire of the user is to lighten up the darker regions 102A-B of the image 100 so that the rugby game (which is occurring largely in the darker region 102A) can be seen more easily by a viewer when the image 100 is displayed. A gain is therefore applied to each selected pixel in accordance with its pixel selection value in order to increase its brightness. For example, a new brightness value of a selected pixel may be generated using the following formula:

New pixel brightness value=Original pixel brightness value×(1+(gain difference×normalised pixel selection value)) [Equation 1]

Thus, for example, consider a gain difference of +0.25 (which increases the brightness value of a pixel by 25%) and a selected pixel with an original brightness value of x. If the selected pixel has a normalised pixel selection value of 1 (this being a pixel positioned well within one of the darker regions 102A-B, relatively far from any boundary with one of the lighter regions 101A-B, for example), then the new pixel brightness value=x×(1+(0.25×1))=1.25x. The full 25% increase in the pixel brightness value is therefore applied. On the other hand, if the selected pixel value only has a normalised pixel selection value of 0.5 (this pixel being positioned at a boundary between one of the darker regions 102A-B and one of the lighter regions 101A-B, for example), then the new pixel brightness value=x×(1+(0.25×0.5))=1.125x. Only a 12.5% increase in the pixel brightness value is therefore applied. For the non-selected pixels (as may be found well within the lighter regions 101A-B, for example), the normalised pixel selection value is 0, and therefore the new pixel brightness value=x×(1+(0.25×0))=x. Thus, there is no gain applied to non-selected pixels and the pixel brightness value does not change.

It can therefore be seen that, for a given user-defined gain increase (+0.25 in this case), the gain has most effect for those pixels with the highest pixel selection value. The effect of the gain then decreases in proportion to the decrease in pixel selection value. Eventually, once the pixel selection value reaches 0 (for pixels which are completely unselected), the gain has no effect at all. In other words, the actual gain applied is a proportion of the user-defined gain as determined by the pixel selection value, with the magnitude of the actual gain applied increasing in proportion to the increase in pixel selection value.

With the present technique, multiple masks can be generated using the mask generation unit 305 and a different gain value for each respective mask can be defined by the user and applied to the image by the gain application and mixing unit 314. The gain application and mixing unit 314 then applies each user-defined gain value to the pixels selected in the mask corresponding to that gain value (taking into account the pixel selection value of each selected pixel). A plurality of gain values may therefore applied to different portions of pixels in the image 100, with the pixels to which each gain is applied and the extent to which that gain is applied being determined by the pixel selection value of each pixel for that particular mask.

For example, in addition to (or, indeed, instead of) the gain increase for the pixels in the darker regions 102A-B so as to lighten up these regions (as described above), a gain decrease could be applied to pixels in the lighter regions 101A-B so as to darken these regions. In this case, after generation of the normalised pixel selection values by the normalisation unit 312 for the pixels in the darker regions 102A-B, the operations of the threshold pixel determining unit 306, dilation unit 208, low pass filter 310 and a normalisation unit 312 are repeated with a higher threshold and with a command from the user to select pixels with a greyscale intensity value which is greater than the higher threshold. For example, the user may command the threshold pixel determining unit 306 to select all pixels with a greyscale intensity value greater than 768. This means that the lighter pixels in the image 100 will be selected, such as the pixels in the lighter regions 101A-B. Again, a selected pixel will be assigned an initial pixel selection value of 1024 and a non-selected pixel will be assigned an initial pixel selection value of 0. Dilation, low pass filtering and normalisation are then performed in the way as previously described (by the dilation unit 308, low pass filter 310 and normalisation unit 312, respectively), thus producing a mask in which with each pixel in the image 100 has a normalised pixel selection value. A user-defined gain can thus be applied to the image 100 based on these normalised pixel selection values.

Thus, for example, consider a gain difference of −0.25 (which decreases the brightness value of a pixel by 25%) and a selected pixel with an original brightness value of x. If the selected pixel has a normalised pixel selection value of 1 (this being a pixel positioned well within one of the lighter regions 101A-B, relatively far from any boundary with one of the darker regions 102A-B, for example), then the new pixel brightness value=x×(1+(−0.25×1))=0.75x. The full 25% decrease in the pixel brightness value is therefore applied. On the other hand, if the selected pixel value only has a normalised pixel selection value of 0.5 (this pixel being positioned at a boundary between one of the darker regions 102A-B and one of the lighter regions 101A-B, for example), then the new pixel brightness value=x×(1+(−0.25×0.5))=0.875x. Only a 12.5% decrease in the pixel brightness value is therefore applied. For the non-selected pixels (as may be found well within the darker regions 102A-B, for example), the normalised pixel selection value is 0, and therefore the new pixel brightness value=x×(1+(−0.25×0))=x. Thus, there is no gain applied to non-selected pixels and the pixel brightness value does not change.

It can therefore be seen that, for a given user-defined gain decrease (−0.25 in this case), the gain has most effect for those pixels with the highest pixel selection value. The effect of the gain then decreases in proportion to the decrease in pixel selection value. Eventually, once the pixel selection value reaches 0 (for pixels which are completely unselected), the gain has no effect at all. In other words, the actual gain applied is a proportion of the user-defined gain as determined by the pixel selection value, with the magnitude of the actual gain applied increasing in proportion to the increase in pixel selection value. It is noted that, in this case, the gain is negative (thus serving to decrease each original pixel brightness value to which it is applied). However, its magnitude (or modulus) is always positive (for example, its magnitude of −0.25=|−0.25|=0.25), and therefore the magnitude of the gain increases in proportion to the increase in pixel selection value, even though the gain value itself becomes more negative as the pixel selection value increases.

It is also possible to have a plurality of different gains applied to an image 100 when there is only a single mask. For example, taking the mask exemplified in FIG. 5B, a user may wish to apply a positive gain so as to lighten up pixels in the darker regions 102A-B and a negative gain so as to darken pixels in the lighter regions 101A-B. In this case, this can be done with the single mask of FIG. 5B using the following formula:

New pixel brightness value=Original pixel brightness value×(1+((positive gain difference×normalised pixel selection value)+(negative gain difference×(1−normalised pixel selection value))) [Equation 2]

Thus, for example, consider a positive gain difference of +0.25 (which increases the brightness value of a pixel by 25%), a negative gain difference of −0.25 (which decreases the brightness value of a pixel by 25%) and a selected pixel with an original brightness value of x. If the selected pixel has a normalised pixel selection of 1 (this being a pixel positioned well within one of the darker regions 102A-B, relatively far from any boundary with one of the darker regions 101A-B, for example), then the new brightness value of such a pixel=x×(1+((0.25×1)+(−0.25× (1−1)))=1.25x. The full 25% increase in the pixel brightness value is therefore applied, and there is no decrease in the pixel brightness value at all.

If the selected pixel has a normalised pixel selection value of 0.8 (this being a pixel positioned within one of the darker regions 102A-B, but relatively close to a boundary with one of the lighter regions 101A-B, for example), then the new brightness value of such a pixel=x×(1+((0.25×0.8)+(−0.25× (1−0.8)))=1.15x. A 15% net increase in the pixel brightness is therefore applied.

If the selected pixel value has a normalised pixel selection value of 0.5 (this pixel being positioned at a boundary between one of the darker regions 102A-B and one of the lighter regions 101A-B, for example), then the new pixel brightness value=x×(1+((0.25×0.5)+(−0.25× (1−0.5)))=x. The brightness value of the pixel is therefore left unchanged.

If the selected pixel has a normalised pixel selection value of 0.2 (this being a pixel positioned within one of the lighter regions 101A-B, but relatively close to a boundary with one of the darker regions 102A-B, for example), then the new brightness value of such a pixel=x×(1+((0.25×0.2)+(−0.25× (1−0.2)))=0.85x. A 15% net decrease in the pixel brightness is therefore applied.

If the selected pixel has a normalised pixel selection of 0 (this being a pixel positioned well within one of the lighter regions 101A-B, relatively far from any boundary with one of the darker regions 102A-B, for example), then the new brightness value of such a pixel=x×(1+((0.25×0)+(−0.25× (1−0)))=0.75x. The full 25% decrease in the pixel brightness value is therefore applied, and there is no increase in the pixel brightness value at all.

It can thus be seen that there is a gradual change in the application of the positive and negative gains depending on the pixel selection values in the image. Pixels with larger pixel selection values (which are most likely to be found in one of the darker regions 102A-B of the image 100) are largely affected by the positive gain but only affected to a small extent (if at all) by the negative gain, and are thus made lighter. Pixels with smaller pixel selection values (which are most likely to be found in one of the lighter regions 101A-B of the image) are largely affected by the negative gain but only affected to a small extent (if at all) by the positive gain, and are thus made darker. Pixels with mid-range magnitude pixel selection values (which are most likely to be found near to a boundary between one of the lighter regions 101A-B and darker regions 102A-B) are affected by the positive gain and negative gain by similar amounts, and thus are not made significantly lighter or darker. This results in a gradual adjustment of the pixel brightness values, with the extent to which the original brightness value of a particular pixel is adjusted being varied depending on the pixel selection value of that pixel (as determined by the mask). This helps provide a natural appearance to the final adjusted image output by the image processor 202, since it helps to avoid having regions in the image which have obviously been lightened or darkened artificially (as may occur, for example, if a fixed gain is simply applied to all pixels in the darker regions 102A-B or the lighter regions 101A-B in order to lighten or darken such pixels).

In general, it will be appreciated that the above description of applying a plurality of different gain values to a single mask could be extended, as appropriate, to any kind of mask, as long as that mask has pixel selection values which vary across the image. Each different gain value can then be applied to an extent determined by the pixel selection value of each pixel, in the way described. As a general example, a first gain value can be applied to each pixel in proportion to its normalised pixel selection value. A second gain value can then be applied to each pixel in proportion to 1—its normalised pixel selection value. An example of such an arrangement is given by Equation 2. It will be appreciated that an alternative arrangement to that given by Equation 2 will be required if it is the pixels of the lighter regions 101A-B of image 100 which are selected by the threshold pixel determining unit 306. In this case, the normalised pixel selection value is highest for the pixels in the lighter pixel regions 101A-B which are furthest from the boundary with the darker pixel regions 102A-B, and the normalised pixel selection value is gradually reduced as pixels closer to the boundaries with the lighter pixel regions 101A-B (and then, within the lighter pixel regions 101A-B) are considered. In this case, the application of both positive and negative gain results in a new pixel brightness value given by:

New pixel brightness value=Original pixel brightness value×(1+((negative gain difference×normalised pixel selection value)+(positive gain difference× (1−normalised pixel selection value)))  [Equation 3]

Thus, once each mask has been determined (including the pixel selection values associated with each mask), one or more gains are applied, by the gain application and exposure mixing unit 314, to the brightness values of the pixels of the received image 100 identified by each mask. The "exposure mixing" component of the gain application and exposure mixing unit 314 refers to the way in which multiple gains can be applied to different extents to different portions of the image 100, thus resulting in, effectively, a mix of different exposure conditions (for example, lighter darker regions 102A-B and darker lighter regions 101A-B) being applied to a single image.

Once the new pixel brightness values have been applied to the image 100 by the gain application and exposure mixing unit 314, an appropriate gamma curve is applied to the image so as to allow it to be displayed on the display 204. For example, the known BT. 1886 gamma curve may be applied. This produces a Standard Dynamic Range (SDR) image, which is then transmitted to the display 204 via the third communication channel 203. The SDR image output to the display will be the image 100 with regions which have been lightened and/or darkened so as to make these regions (for example, the darker region 102A in which the rugby game in the image 100 is being played) easier to see in the image. Furthermore, since this lightening and/or darkening has been carried out on the HDR version of the image by the image processor 202, details in the shadows and/or highlights of these regions will be retained, thus further improving the image.

It is noted that although the present technique has been described as relating to a single image 100, it may also be applied in real time to each frame of a video image (each frame of a video image essentially being a single still image like image 100). In this case, each video frame is captured as an HDR image by the camera 200 and transmitted to the image processor 202 as an HDR image. The HDR image is then processed in the way described above so that appropriate parts of the image are darkened and/or lightened, and the image is then output to the display 204 as an SDR image. Such an arrangement is useful, for example, for capturing and broadcasting videos of live events such as sporting events in real time, since it allows images to be adjusted in real time without losing detail from the shadows or highlights and displayed on conventional displays which don't necessary support the display of HDR images. In addition, since the adjustment is performed on a frame by frame basis (for example, without the need to refer to other frames), the adjustment responds quickly to changing light conditions (as occurs, for example, as a video camera is panned across a scene with non-uniform light conditions).

It will also be appreciated that, although the camera 200, image processor 202 and display 204 are shown as separate components in FIG. 2, these components may in fact be comprised within a single device, such as a digital camera, digital camcorder, mobile phone, smart phone, tablet computer, laptop computer or the like. It is known that such devices may comprise an electronic viewfinder for helping a user to capture still images and/or video, and thus the display 204 could be used as such an electronic viewfinder. When the display 204 acts as an electronic viewfinder, images are captured, processed and displayed at a predetermined frame rate (for example, 24, 50 or 60 images per second). Because the images which are displayed have been adjusted in real time according to the present technique, the details of interest in the images can be seen more easily by the user through the electronic viewfinder, prior to the user recording an image or video (or, in the case of a video, during recording of the video). This makes it easier for a user to determine the desirability of an image or video before it is recorded. In particular, it helps the user to determine whether or not the highlights and shadows are correctly focussed (this being particularly useful when, for example, a video signal is being recorded as an HDR signal).

In one embodiment, an additional gain adjustment may be made (by the gain application and exposure mixing unit 314, for example) to the brightness values of all pixels in at least a portion of the image based on a function of the brightness value of one or more pixels in that portion of the image (this may be referred to as a brightness function). For example, the additional gain adjustment may be made based on the average brightness value of the pixels in the portion of the image, the average brightness value of the pixels in a sub-portion of the portion of the image (the sub-portion excluding the pixels defining the border of the portion of the image, for example) or the maximum brightness value of the pixels within the portion of the image (each of these being an example of the brightness function). The size of this gain adjustment may depend on the difference between the brightness function and a threshold brightness value (the threshold brightness value being determined by the user or automatically via a suitable image analysis technique known to the skilled person, for example). This additional gain adjustment is applied in addition to the gain adjustments described above. Thus, for example, the additional gain adjustment is applied to the "new pixel brightness value" of each pixel in the portion of the image as identified by Equation 1, 2 or 3. An example of adjusting the new pixel brightness value of each pixel in the portion of the image is given by Equation 4:

$$\text{Adjusted new brightness pixel value} = \text{new pixel brightness value} \times \left(1 - \frac{\text{threshold brightness value} - \text{brightness function}}{\text{brightness function}}\right) \quad [\text{Equation 4}]$$

Thus, in this case, the adjusted new pixel value of each pixel in the portion of the image is increased (or reduced) in proportion the difference between the threshold brightness value and the brightness function.

This is particularly applicable to original images input to image processor 202 which are generated by extracting portions of a larger captured image (such as a 4K image or an image generated by stitching a plurality of images together). Such images may be referred to as cut-out images, and may be output by camera 200 when the camera 200 is a virtual camera (a virtual camera being a tool via which cut-out images are generated from a larger captured image). Virtual cameras and cut-out images are described in UK patent application publication GB2512628A, for example. This appropriately adjusts the overall exposure of the images output by the image processor 202 as the camera is moved from areas of darkness to brightness (and vice versa). In particular, it gives the processed images a more natural look (mimicking, for example, the way that the exposure of a real camera is manually adjusted as the camera moves from areas of darkness to brightness (and vice versa)) and makes them more comfortable to view for the user.

It is noted that the described technique works particularly well for certain types of images. Images to be processed by the image processor 202 may be pre-processed using image pre-processor 206 so as to enhance one or more characteristics that make them particularly suitable for being processed using the described technique. For example, in order to reduce the introduction of halo artefacts during processing of images in which a foreground object is silhouetted against a bright background, the images may be pre-processed such that the described technique is only applied to foreground objects in the image. This may be achieved by, for example, using a camera 200 with a depth sensor (not shown) which generates depth information of objects in the image. The depth information may be, for example, a depth map which maps the depth of each pixel in the captured image (the depth being, for example, the depth in the Z-axis direction of the camera 200 or, more generally, in the Z-axis direction of the viewpoint from which the captured image is captured). The captured image is then supplied, together with the depth information, to the image pre-processor 206. The image pre-processor 206 determines a portion of the captured image to be supplied to the image processor 202 by selecting all pixels with a depth below a predetermined threshold value. The image pre-processor 206 then supplies this determined portion of the captured image to the image processor 202 so that the described image processing technique is applied only to this portion. The predetermined depth threshold value may be determined by the user or automatically, and may vary depending on the content of the scene which is captured, for example. Alternatively, applying the described technique to only foreground objects could be achieved using a suitable image segmentation effect (so that, for example, each foreground objects is separated as a separate image segment to which the described technique can then be applied—in this case, the image pre-processor 206 will extract each image segment as a respective image portion and will pass each image portion to the image processor 202, for example). Camera depth sensors (and the generation of depth maps) and image segmentation effects are known in the art and will therefore not be described in detail here.

It will also be appreciated that, although the described technique has been described in relation to processing a captured image, it will be appreciated that the technique may be applied, more generally, to a portion of a captured image. A plurality of portions may even be extracted from a single captured image, with each portion then being processed in the way described. In one example, different threshold(s) and/or gain(s) could be applied to each respective portion depending on the content of each portion. For example, a higher gain might be applied to a person's face than to a background area. Known object classification techniques could be used to identify one or more portions of a captured image which represent important objects (such as faces) and to thus extract those portions from the captured image, for example. In another example, one or more portions of a captured image may be extracted by a manual masking technique, or by a more automated segmentation technique such as colour segmentation, texture segmentation, depth-based segmentation, segmentation based on edge detection or any other known technique. One or more portions of a captured image may also be extracted on the basis of depth information, as previously described. In each of these cases, it is the one or more portions of the captured image which are processed by the image processor 202. The one or more portions may be extracted from an image captured by the camera 200 by the image pre-processor 206.

It is also noted that although, in order to ensure clarity of explanation, certain aspects of the image processor 202 have been explained in terms of operations performed on integer numbers (such as the integer numbers 0 to 1023), it will be appreciated by the skilled person that, in general, one or more of the described processes carried out by the image processor 202 may, in fact, be carried out on signals represented more generally by floating point numbers (including non-integer numbers). This may be the case, for example, when calculations associated with one or more of the processes carried out by the image processor 202 are carried out at a higher precision (that is, using a higher number of bits) than the input or output signals to the image processor 202.

It will thus be appreciated that the present technique provides an arrangement in which a first image signal representing a portion of a captured image with a first dynamic range (such as an S-Log3 signal) is received. A value indicative of the brightness of each pixel in the portion of the captured image (for example, the pixel luma) is represented by the first image signal in a first format such that the first dynamic range of the portion of the captured image is preserved. A second image signal is then generated using the first image signal. A value indicative of the brightness of each pixel in the portion of the captured image is represented by the second image signal in a second format, the second format being for displaying the portion of the captured image on a display and being such that the second image signal represents the portion of the captured image with a second dynamic range which is lower than the first dynamic range. The second image signal is then output for display of the portion of the captured image. The second image signal is generated by applying one of a first gain to the brightness value of each pixel in the portion of the captured image represented by the first image signal having a brightness value less than a first threshold brightness value, the first gain serving to increase the brightness value of each pixel to which it is applied (thus allowing darker regions of the image to be brightened), and a second gain to the brightness value of each pixel in the portion of the captured image represented by the first image signal having a brightness value greater than a second threshold brightness value, the second gain serving to decrease the brightness value of each pixel to which it is applied (thus allowing brighter regions of the image to be darkened). After the application of the one of the first and second gains, a conversion process is performed such that the brightness value of each pixel in the portion of the captured image represented by the first image signal becomes represented in the second format, thus forming the second image signal. This allows an adjusted version of the portion of the captured image (as defined by the second image signal) to be displayed, with a reduced loss of detail in the highlights or shadows caused by the reduced dynamic range available for the second image signal.

In an embodiment, the portion of the captured image as represented by the first image signal is a high dynamic range (HDR) image and the portion of the captured image as represented by the second image signal is a standard dynamic range (SDR) image.

In an embodiment, the application the first gain comprises assigning each pixel with a brightness value less than the first threshold brightness value a first pixel selection value (such as 1023) indicating that the pixel has been selected and assigning each pixel with a brightness value greater than the first threshold brightness value a second pixel selection value (such as 0) indicating that the pixel has not been selected. A dilation function and a low pass filter function are then applied to an array comprising the first and second pixel selection values, wherein the position of each of the first and second pixel selection values in the array corresponds to the position of the pixel in the portion of the captured image to which the first or second pixel selection value relates (the pixel selection values may be distributed across the array in a manner as exemplified by FIG. 5A, for example). The application of the dilation function and low pass filter function results in a first array of adjusted pixel selection values (the adjusted pixel selection values may be distributed across the first array in a manner as exemplified by FIG. 5B, for example). A first predetermined gain (as determined by the user, for example) is then applied to each pixel in the portion of the captured image represented by the first image signal to an extent determined on the basis of the adjusted pixel selection value of the pixel defined in the first array of adjusted pixel selection values. Similarly, the application of the second gain comprises assigning each pixel with a brightness value greater than the second threshold brightness value a third pixel selection value (for example 1023) indicating that the pixel has been selected and assigning each pixel with a brightness value less than the second threshold brightness value a fourth pixel selection value (such as 0) indicating that the pixel has not been selected. A dilation function and a low pass filter function is then applied to an array comprising the third and fourth pixel selection values, wherein the position of each of the third and fourth pixel selection values in the array corresponds to the position of the pixel in the portion of the captured image to which the third or fourth pixel selection value relates. The application of the dilation function and low pass filter function results in a second array of adjusted pixel selection values. A second predetermined gain (as determined by the user, for example) is then applied to each pixel in the portion of the captured image represented by the first image signal to an extent determined on the basis of the adjusted pixel selection value of the pixel defined in the second array of the adjusted pixel selection values.

Figure 6:
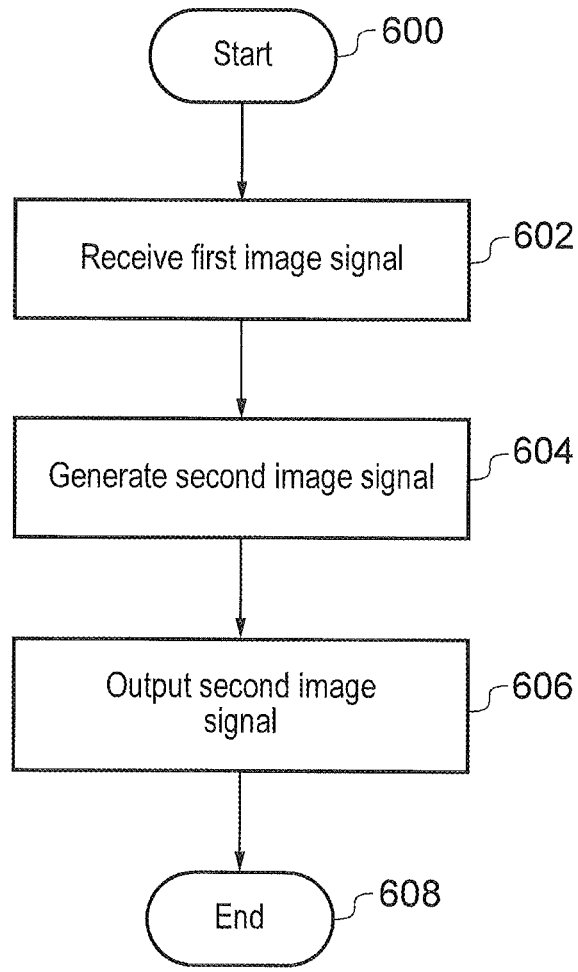
FIG. 6 shows a flow chart which schematically illustrates a process according to an embodiment of the present technique.

FIG. 6 shows a flow chart which schematically illustrates a process according to an embodiment of the present technique. The process starts at step 600. At step 602, the first image signal is received. At step 604, the second image signal is generated (by applying at least one of the first gain and the second gain and then performing the conversion process, as previously described). At step 606, the second image signal is output for display. The process then ends at step 608.

Various features of embodiments of the present technique are defined by the following numbered clauses:

1. An image processing method comprising:
    receiving a first image signal representing a portion of a captured image with a first dynamic range, wherein a value indicative of the brightness of each pixel in the portion of the captured image is represented by the first image signal in a first format such that the first dynamic range of the portion of the captured image is preserved;
    generating a second image signal using the first image signal, wherein a value indicative of the brightness of each pixel in the portion of the captured image is represented by the second image signal in a second format, the second format being for displaying the portion of the captured image on a display and being such that the second image signal represents the portion of the captured image with a second dynamic range which is lower than the first dynamic range; and
    outputting the second image signal for display of the portion of the captured image; wherein the second image signal is generated by:
    applying one of:
    a first gain to the brightness value of each pixel in the portion of the captured image represented by the first image signal having a brightness value less than a first threshold brightness value, the first gain serving to increase the brightness value of each pixel to which it is applied, and
    a second gain to the brightness value of each pixel in the portion of the captured image represented by the first image signal having a brightness value greater than a second threshold brightness value, the second gain serving to decrease the brightness value of each pixel to which it is applied; and
    after the application of the one of the first and second gains, performing a conversion process such that the brightness value of each pixel in the portion of the captured image represented by the first image signal becomes represented in the second format, thus forming the second image signal.

2. An image processing method according to clause 1, wherein the possible brightness values of each pixel in the portion of the captured image as represented by the first image signal are determined in accordance with a logarithmic gamma curve.

3. An image processing method according to clause 2, wherein the logarithmic gamma curve is an S-Log3 logarithmic gamma curve.

4. An image processing method according to any preceding clause, wherein the brightness value of each pixel in the portion of the captured image as represented by the first image signal is a luminance value.

5. An image processing method according to any preceding clause, wherein:
the application of the first gain comprises:
assigning each pixel with a brightness value less than the first threshold brightness value a first pixel selection value indicating that the pixel has been selected and assigning each pixel with a brightness value greater than the first threshold brightness value a second pixel selection value indicating that the pixel has not been selected;
applying a dilation function and a low pass filter function to an array comprising the first and second pixel selection values, wherein the position of each of the first and second pixel selection values in the array corresponds to the position of the pixel in the portion of the captured image to which the first or second pixel selection value relates, the application of the dilation function and low pass filter function resulting in a first array of adjusted pixel selection values; and
applying a first predetermined gain to each pixel in the portion of the captured image represented by the first image signal to an extent determined on the basis of the adjusted pixel selection value of the pixel defined in the first array of adjusted pixel selection values; and
the application of the second gain comprises:
assigning each pixel with a brightness value greater than the second threshold brightness value a third pixel selection value indicating that the pixel has been selected and assigning each pixel with a brightness value less than the second threshold brightness value a fourth pixel selection value indicating that the pixel has not been selected;
applying a dilation function and a low pass filter function to an array comprising the third and fourth pixel selection values, wherein the position of each of the third and fourth pixel selection values in the array corresponds to the position of the pixel in the portion of the captured image to which the third or fourth pixel selection value relates, the application of the dilation function and low pass filter function resulting in a second array of adjusted pixel selection values; and
applying a second predetermined gain to each pixel in the portion of the captured image represented by the first image signal to an extent determined on the basis of the adjusted pixel selection value of the pixel defined in the second array of the adjusted pixel selection values.

6. An image processing method according to clause 5, wherein:
the first pixel selection value is greater than the second pixel selection value, and the first predetermined gain is applied to each pixel in the portion of the captured image in proportion to the adjusted pixel selection value of the pixel; and
the third pixel selection value is greater than the fourth pixel selection value, and the second predetermined gain is applied to each pixel in the portion of the captured image in proportion to the adjusted pixel selection value of the pixel.

7. An image processing method according to clause 6, wherein each adjusted pixel selection value in each of the first and second arrays of adjusted pixel selection values is normalised such that it takes a value in a range from 0 to 1.

8. An image processing method according to any preceding clause, wherein the first and second gains are applied to the portion of the captured image represented by the first image signal simultaneously.

9. An image processing method according to clause 7, wherein the first and second gains are applied to the portion of the captured image represented by the first image signal simultaneously, and wherein either:
the adjusted pixel selection value of each pixel in the first array of adjusted pixel selection values is equal to 1 minus the adjusted pixel selection value of the pixel in the second array of adjusted pixel selection values; or
the adjusted pixel selection value of each pixel in the second array of adjusted pixel selection values is equal to 1 minus the adjusted pixel selection value of the pixel in the first array of adjusted pixel selection values.

10. An image processing method according to any preceding clause, comprising generating the portion of the captured image represented by the first image signal such that all objects in the portion of the captured image have a depth in the direction of the Z-axis of the viewpoint at which the captured image is captured which is less than a threshold depth value.

11. An image processing method according to any preceding clause, wherein an additional gain is applied to the brightness value of all pixels of the portion of the captured image based on the difference between a third threshold brightness value and a function of the brightness value of one or more pixels of the portion of the captured image.

12. An image processing apparatus comprising an image processor operable to:
receive a first image signal representing a portion of a captured image with a first dynamic range, wherein a value indicative of the brightness of each pixel in the portion of the captured image is represented by the first image signal in a first format such that the first dynamic range of the portion of the captured image is preserved;
generate a second image signal using the first image signal, wherein a value indicative of the brightness of each pixel in the portion of the captured image is represented by the second image signal in a second format, the second format being for displaying the portion of the captured image on a display and being such that the second image signal represents the portion of the captured image with a second dynamic range which is lower than the first dynamic range; and
output the second image signal for display of the portion of the captured image; wherein the second image signal is generated by:
applying one of:
a first gain to the brightness value of each pixel in the portion of the captured image represented by the first image signal having a brightness value less than a first threshold brightness value, the first gain serving to increase the brightness value of each pixel to which it is applied, and
a second gain to the brightness value of each pixel in the portion of the captured image represented by the first image signal having a brightness value greater than a second threshold brightness value, the second gain serving to decrease the brightness value of each pixel to which it is applied; and
after the application of the one of the first and second gains, performing a conversion process such that the brightness value of each pixel in the portion of the captured image represented by the first image signal becomes represented in the second format, thus forming the second image signal.

13. An image processing apparatus according to clause 12, wherein the possible brightness values of each pixel in the portion of the captured image as represented by the first image signal are determined in accordance with a logarithmic gamma curve.

14. An image processing apparatus according to clause 13, wherein the logarithmic gamma curve is an S-Log3 logarithmic gamma curve.

15. An image processing apparatus according to any one of clauses 12 to 14, wherein the brightness value of each pixel in the portion of the captured image as represented by the first image signal is a luminance value.

16. An image processing apparatus according to any one of clauses 12 to 15, wherein:
the application of the first gain comprises:
assigning each pixel with a brightness value less than the first threshold brightness value a first pixel selection value indicating that the pixel has been selected and assigning each pixel with a brightness value greater than the first threshold brightness value a second pixel selection value indicating that the pixel has not been selected;
applying a dilation function and a low pass filter function to an array comprising the first and second pixel selection values, wherein the position of each of the first and second pixel selection values in the array corresponds to the position of the pixel in the portion of the captured image to which the first or second pixel selection value relates, the application of the dilation function and low pass filter function resulting in a first array of adjusted pixel selection values; and
applying a first predetermined gain to each pixel in the portion of the captured image represented by the first image signal to an extent determined on the basis of the adjusted pixel selection value of the pixel defined in the first array of adjusted pixel selection values; and
the application of the second gain comprises:
assigning each pixel with a brightness value greater than the second threshold brightness value a third pixel selection value indicating that the pixel has been selected and assigning each pixel with a brightness value less than the second threshold brightness value a fourth pixel selection value indicating that the pixel has not been selected;
applying a dilation function and a low pass filter function to an array comprising the third and fourth pixel selection values, wherein the position of each of the third and fourth pixel selection values in the array corresponds to the position of the pixel in the portion of the captured image to which the third or fourth pixel selection value relates, the application of the dilation function and low pass filter function resulting in a second array of adjusted pixel selection values; and
applying a second predetermined gain to each pixel in the portion of the captured image represented by the first image signal to an extent determined on the basis of the adjusted pixel selection value of the pixel defined in the second array of the adjusted pixel selection values.

17. An image processing apparatus according to clause 16, wherein:
the first pixel selection value is greater than the second pixel selection value, and the first predetermined gain is applied to each pixel in the portion of the captured image in proportion to the adjusted pixel selection value of the pixel; and
the third pixel selection value is greater than the fourth pixel selection value, and the second predetermined gain is applied to each pixel in the portion of the captured image in proportion to the adjusted pixel selection value of the pixel.

18. An image processing apparatus according to clause 17, wherein each adjusted pixel selection value in each of the first and second arrays of adjusted pixel selection values is normalised such that it takes a value in a range from 0 to 1.

19. An image processing apparatus according to any one of clauses 12 to 18, wherein the first and second gains are applied to the portion of the captured image represented by the first image signal simultaneously.

20. An image processing apparatus according to clause 18, wherein the first and second gains are applied to the portion of the captured image represented by the first image signal simultaneously, and wherein either:
the adjusted pixel selection value of each pixel in the first array of adjusted pixel selection values is equal to 1 minus the adjusted pixel selection value of the pixel in the second array of adjusted pixel selection values; or
the adjusted pixel selection value of each pixel in the second array of adjusted pixel selection values is equal to 1 minus the adjusted pixel selection value of the pixel in the first array of adjusted pixel selection values.

21. An image processing apparatus according to any one of clauses 12 to 20, comprising an image pre-processor operable to generate the portion of the captured image represented by the first image signal such that all objects in the portion of the captured image have a depth in the direction of the Z-axis of the viewpoint at which the captured image is captured which is less than a threshold depth value.

22. An image processing apparatus according to any one of clauses 12 to 20, wherein the generation of the second image signal comprises applying an additional gain to the brightness value of all pixels of the portion of the captured image based on the difference between a third threshold brightness value and a function of the brightness value of one or more pixels of the portion of the captured image.

23. Integrated circuitry for an image processing apparatus, the integrated circuitry comprising an image processing element operable to:
receive a first image signal representing a portion of a captured image with a first dynamic range, wherein a value indicative of the brightness of each pixel in the portion of the captured image is represented by the first image signal in a first format such that the first dynamic range of the portion of the captured image is preserved;
generate a second image signal using the first image signal, wherein a value indicative of the brightness of each pixel in the portion of the captured image is represented by the second image signal in a second format, the second format being for displaying the portion of the captured image on a display and being such that the second image signal represents the portion of the captured image with a second dynamic range which is lower than the first dynamic range; and
output the second image signal for display of the portion of the captured image; wherein the second image signal is generated by:

applying one of:
a first gain to the brightness value of each pixel in the portion of the captured image represented by the first image signal having a brightness value less than a first threshold brightness value, the first gain serving to increase the brightness value of each pixel to which it is applied, and
a second gain to the brightness value of each pixel in the portion of the captured image represented by the first image signal having a brightness value greater than a second threshold brightness value, the second gain serving to decrease the brightness value of each pixel to which it is applied; and
after the application of the one of the first and second gains, performing a conversion process such that the brightness value of each pixel in the portion of the captured image represented by the first image signal becomes represented in the second format, thus forming the second image signal.

24. A recording medium storing a computer program for controlling a computer to perform a method according to any one of clauses 1 to 11.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. An image processing method comprising:
receiving a first image signal representing a portion of a captured image with a first dynamic range, wherein a value indicative of the brightness of each pixel in the portion of the captured image is represented by the first image signal in a first format such that the first dynamic range of the portion of the captured image is preserved;
generating a second image signal using the first image signal, wherein a value indicative of the brightness of each pixel in the portion of the captured image is represented by the second image signal in a second format, the second format being for displaying the portion of the captured image on a display and being such that the second image signal represents the portion of the captured image with a second dynamic range which is lower than the first dynamic range; and
outputting the second image signal for display of the portion of the captured image; wherein the second image signal is generated by:
applying one of:
a first gain to the brightness value of each pixel, in the portion of the captured image represented by the first image signal, having a brightness value less than a first threshold brightness value, the first gain serving to increase the brightness value of each pixel to which it is applied, and
a second gain to the brightness value of each pixel, in the portion of the captured image represented by the first image signal, having a brightness value greater than a second threshold brightness value, the second gain serving to decrease the brightness value of each pixel to which it is applied; and
after the application of the one of the first and second gains, performing a conversion process such that the brightness value of each pixel in the portion of the captured image represented by the first image signal becomes represented in the second format, thus forming the second image signal,
wherein the first and second gains are applied to different pixels in the portion of the captured image represented by the first image signal simultaneously.

2. The image processing method according to claim 1, wherein the possible brightness values of each pixel in the portion of the captured image as represented by the first image signal are determined in accordance with a logarithmic gamma curve.

3. The image processing method according to claim 2, wherein the logarithmic gamma curve is an S-Log3 logarithmic gamma curve.

4. The image processing method according to claim 1, wherein the brightness value of each pixel in the portion of the captured image as represented by the first image signal is a luminance value.

5. The image processing method according to claim 1, wherein:
the application of the first gain comprises:
assigning each pixel with a brightness value less than the first threshold brightness value a first pixel selection value indicating that the pixel has been selected and assigning each pixel with a brightness value greater than the first threshold brightness value a second pixel selection value indicating that the pixel has not been selected;
applying a dilation function and a low pass filter function to an array comprising the first and second pixel selection values, wherein the position of each of the first and second pixel selection values in the array corresponds to the position of the pixel in the portion of the captured image to which the first or second pixel selection value relates, the application of the dilation function and low pass filter function resulting in a first array of adjusted pixel selection values; and applying a first predetermined gain to each pixel in the portion of the captured image represented by the first image signal to an extent determined on the basis of the adjusted pixel selection value of the pixel defined in the first array of adjusted pixel selection values; and the application of the second gain comprises:

assigning each pixel with a brightness value greater than the second threshold brightness value a third pixel selection value indicating that the pixel has been selected and assigning each pixel with a brightness value less than the second threshold brightness value a fourth pixel selection value indicating that the pixel has not been selected;

applying a dilation function and a low pass filter function to an array comprising the third and fourth pixel selection values, wherein the position of each of the third and fourth pixel selection values in the array corresponds to the position of the pixel in the portion of the captured image to which the third or fourth pixel selection value relates, the application of the dilation function and low pass filter function resulting in a second array of adjusted pixel selection values; and applying a second predetermined gain to each pixel in the portion of the captured image represented by the first image signal to an extent determined on the basis of the adjusted pixel selection value of the pixel defined in the second array of the adjusted pixel selection values.

6. The image processing method according to claim 5, wherein:

the first pixel selection value is greater than the second pixel selection value, and the first predetermined gain is applied to each pixel in the portion of the captured image in proportion to the adjusted pixel selection value of the pixel; and the third pixel selection value is greater than the fourth pixel selection value, and the second predetermined gain is applied to each pixel in the portion of the captured image in proportion to the adjusted pixel selection value of the pixel.

7. The image processing method according to claim 6, wherein each adjusted pixel selection value in each of the first and second arrays of adjusted pixel selection values is normalised such that it takes a value in a range from 0 to 1.

8. An image processing apparatus comprising an image processor circuitry operable to:

receive a first image signal representing a portion of a captured image with a first dynamic range, wherein a value indicative of the brightness of each pixel in the portion of the captured image is represented by the first image signal in a first format such that the first dynamic range of the portion of the captured image is preserved;

generate a second image signal using the first image signal, wherein a value indicative of the brightness of each pixel in the portion of the captured image is represented by the second image signal in a second format, the second format being for displaying the portion of the captured image on a display and being such that the second image signal represents the portion of the captured image with a second dynamic range which is lower than the first dynamic range; and output the second image signal for display of the portion of the captured image; wherein the second image signal is generated by:

applying one of:

a first gain to the brightness value of each pixel, in the portion of the captured image represented by the first image signal, having a brightness value less than a first threshold brightness value, the first gain serving to increase the brightness value of each pixel to which it is applied, and a second gain to the brightness value of each pixel, in the portion of the captured image represented by the first image signal, having a brightness value greater than a second threshold brightness value, the second gain serving to decrease the brightness value of each pixel to which it is applied; and after the application of the one of the first and second gains, performing a conversion process such that the brightness value of each pixel in the portion of the captured image represented by the first image signal becomes represented in the second format, thus forming the second image signal, wherein the first and second gains are applied to different pixels in the portion of the captured image represented by the first image signal simultaneously.

9. The image processing apparatus according to claim 8, wherein the possible brightness values of each pixel in the portion of the captured image as represented by the first image signal are determined in accordance with a logarithmic gamma curve.

10. The image processing apparatus according to claim 9, wherein the logarithmic gamma curve is an S-Log3 logarithmic gamma curve.

11. The image processing apparatus according to claim 8, wherein the brightness value of each pixel in the portion of the captured image as represented by the first image signal is a luminance value.

12. The image processing apparatus according to claim 8, wherein:

the application of the first gain comprises:

assigning each pixel with a brightness value less than the first threshold brightness value a first pixel selection value indicating that the pixel has been selected and assigning each pixel with a brightness value greater than the first threshold brightness value a second pixel selection value indicating that the pixel has not been selected;

applying a dilation function and a low pass filter function to an array comprising the first and second pixel selection values, wherein the position of each of the first and second pixel selection values in the array corresponds to the position of the pixel in the portion of the captured image to which the first or second pixel selection value relates, the application of the dilation function and low pass filter function resulting in a first array of adjusted pixel selection values; and applying a first predetermined gain to each pixel in the portion of the captured image represented by the first image signal to an extent determined on the basis of the adjusted pixel selection value of the pixel defined in the first array of adjusted pixel selection values; and the application of the second gain comprises:

assigning each pixel with a brightness value greater than the second threshold brightness value a third pixel selection value indicating that the pixel has been selected and assigning each pixel with a brightness value less than the second threshold brightness value a fourth pixel selection value indicating that the pixel has not been selected;

applying a dilation function and a low pass filter function to an array comprising the third and fourth pixel selection values, wherein the position of each of the third and fourth pixel selection values in the array corresponds to the position of the pixel in the portion of the captured image to which the third or fourth pixel selection value relates, the application of the dilation function and low pass filter function resulting in a second array of adjusted pixel selection values; and applying a second predetermined gain to each pixel in the portion of the captured image represented by the first image signal to an extent determined on the basis of the adjusted pixel selection value of the pixel defined in the second array of the adjusted pixel selection values.

13. The image processing apparatus according to claim 12, wherein:

the first pixel selection value is greater than the second pixel selection value, and the first predetermined gain is applied to each pixel in the portion of the captured image in proportion to the adjusted pixel selection value of the pixel; and the third pixel selection value is greater than the fourth pixel selection value, and the second predetermined gain is applied to each pixel in the portion of the captured image in proportion to the adjusted pixel selection value of the pixel.

14. The image processing apparatus according to claim 13, wherein each adjusted pixel selection value in each of the first and second arrays of adjusted pixel selection values is normalised such that it takes a value in a range from 0 to 1.

15. The image processing apparatus according to claim 14, wherein either:

the adjusted pixel selection value of each pixel in the first array of adjusted pixel selection values is equal to 1 minus the adjusted pixel selection value of the pixel in the second array of adjusted pixel selection values; or the adjusted pixel selection value of each pixel in the second array of adjusted pixel selection values is equal to 1 minus the adjusted pixel selection value of the pixel in the first array of adjusted pixel selection values.

16. The image processing apparatus according to claim 8, comprising an image pre-processor circuitry operable to generate the portion of the captured image represented by the first image signal such that all objects in the portion of the captured image have a depth in the direction of the Z-axis of the viewpoint at which the captured image is captured which is less than a threshold depth value.

17. The image processing apparatus according to claim 8, wherein the generation of the second image signal comprises applying an additional gain to the brightness value of all pixels of the portion of the captured image based on the difference between a third threshold brightness value and a function of the brightness value of one or more pixels of the portion of the captured image.

18. A recording medium storing a computer program for controlling a computer to perform a method according to claim 1.

* * * * *